March 9, 1954  M. A. CHAVANNES ET AL  2,671,496
METHOD AND APPARATUS FOR BONDING FIBERS TOGETHER
Filed March 23, 1950  3 Sheets-Sheet 2

INVENTORS.
MARC A. CHAVANNES
JAMES W. HOWDEN
BY
ATTORNEY.

March 9, 1954    M. A. CHAVANNES ET AL    2,671,496
METHOD AND APPARATUS FOR BONDING FIBERS TOGETHER
Filed March 23, 1950    3 Sheets-Sheet 3

INVENTORS.
MARC A. CHAVANNES
JAMES W. HOWDEN
BY
ATTORNEY.

Patented Mar. 9, 1954

2,671,496

UNITED STATES PATENT OFFICE 2,671,496

METHOD AND APPARATUS FOR BONDING FIBERS TOGETHER

Marc A. Chavannes, Pompton Lakes, N. J., and James W. Howden, New York, N. Y., assignors to Chavannes Industrial Synthetics, Inc., a corporation of Delaware Application March 23, 1950, Serial No. 151,474

11 Claims. (Cl. 154—29)

The present invention relates to a method and apparatus for bonding fibers together to produce batting, padding material, and a variety of other materials and articles formed from fibers, and to the product thereof.

One object of the invention is to produce batting. By following the teachings of the present invention it is possible to produce, rapidly and inexpensively, a superior type of loosely-compacted batting, of cotton fibers or the like, bonded together with a thermoplastic resin. Such batting may be used directly for a variety of purposes, for example, packing material and insulating material. It may also be used in forming pads for wearing apparel, such as shoulder pads.

While the present invention has certain unique advantages when cotton fibers are used, it is also useful when fibers of other types are employed, for example, fibers of hair, fur, silk, flax, jute, sisal, glass, wool, cellulose, mineral fibers, synthetic fibers, other types of fibers, and mixtures of various fibers. In general, the fibers should be able to withstand temperatures as great as that at which the thermoplastic resin employed becomes soft and tacky.

One important feature of the invention is that the resin is introduced by blowing into and through an advancing layer of fibers a stream of air or other gas bearing fine resin powder. The layer of fibers removes, by a filtering action, resin from the air stream, and the resin is thereby incorporated into the layer of fibers. Thereafter the resin is first heated to a tacky condition by blowing hot air through the layer, and then cooled by blowing cool air through it, whereby the resin bonds some of the fibers to one another.

In one embodiment of the invention, the fibers, of cotton for example, are first arranged as a layer on a continuously-advancing belt. Dry, powdered thermoplastic resin, for example, a copolymer of vinyl acetate and vinyl chloride, is mixed with an air stream and blown into the advancing layer of fibers from the exposed surface of the layer. The resin penetrates into the interior of the layer. The fibers and the incorporated powdered resin are then cross-lapped onto a moving apron or belt advancing in a direction transverse with respect to that in which the first-mentioned belt moves. In this manner there is built up a fluffy composite mass, including a plurality of layers of cotton fibers with powdered resin uniformly distributed throughout. The fluffy composite mass is then passed through pressure rolls, which loosely compact it so as to decrease its thickness. It then advances through a heating zone, where hot air is blown through it, to raise the temperature of the powdered resin to the softening point. Under this condition the powdered, thermoplastic resin becomes tacky and causes the fibers to adhere to one another. In the heating zone the mass may be further compacted. It is then passed through a cooling zone, with its upper and lower surfaces preferably held parallel, where cool air is blown through it to set the resin, thereby forming the desired batting.

The resulting batting is a very useful product. It may be used to produce a variety of pad-like articles, by first severing it into the approximate shape desired and then moulding the severed pieces under heat and pressure to conform to the exact shape desired. This procedure is especially useful in producing pads for wearing apparel, for example, shoulder pads. It may also be used without substantial further modification as packing material, insulating material, or the like.

The above-mentioned, as well as other features, together with the many advantages obtainable by the practice of the present invention, will be readily comprehended by persons skilled in the art by reference to the following detailed description taken in connection with the annexed drawings which respectively describe and illustrate a preferred embodiment of the invention, and wherein Fig. 1 is a plan view of apparatus illustrating the invention.

Fig. 2 is a view chiefly in side elevation of a portion of the apparatus shown in Fig. 1. The point of view of Fig. 2 is shown at 2—2 in Fig. 1.

Fig. 3 is an enlarged view chiefly in vertical section of a portion of the apparatus shown in Figs. 1 and 2. The sectional plane for Fig. 3 is shown at 3—3 in Fig. 1. The apparatus shown in Fig. 3 includes means for directing through a layer of cotton a stream of air mixed with powdered resin.

It will be understood that the various figures are, in general, schematic in nature.

Figure 1:
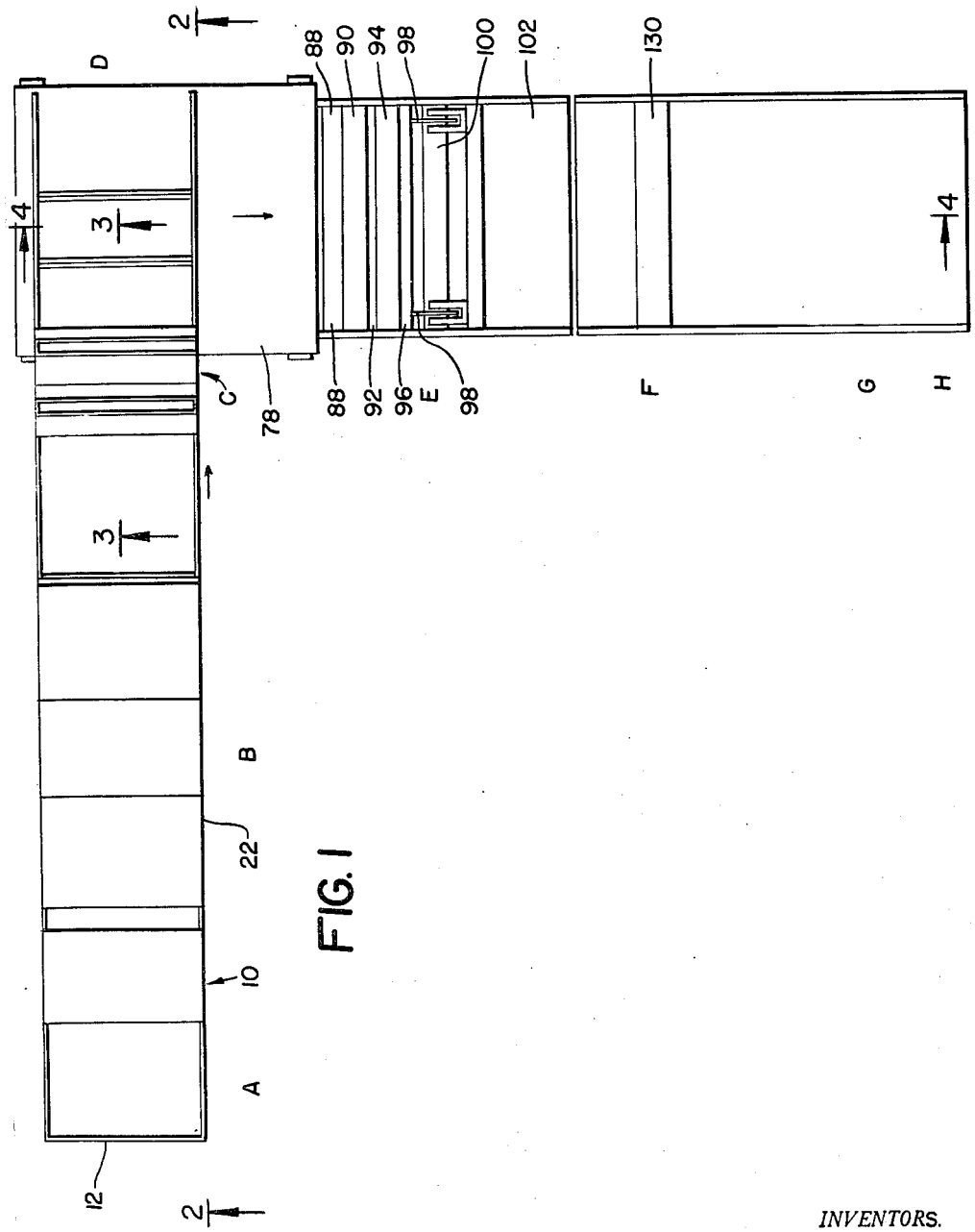

Referring to Fig. 1, it may be generally explained that fibers, or material from which fibers may be derived as by shredding, are introduced at station A, and are advanced progressively through the apparatus from left to right past station B, where they are arranged as a layer, past station C, where a powdered resin is introduced, to station D, where the fibers are arranged as a plurality of layers, the resin being uniformly distributed throughout the fibers. From station D the composite mass advances in a direction transverse to its original path, past station E, where it is compacted somewhat and its edges trimmed, past station F, where it is heated and also slightly compacted, past station G, where it is cooled, and it emerges from the apparatus at station H as batting.

In Fig. 1 there is shown a feeder, generally indicated at 10, including a bin 12. Fibers are fed into this bin. These fibers may be in the form of raw cotton, cotton sweepings, textiles, fibers of various types including those mentioned previously herein, or a mixture of various substances. One suitable substance comprises a mixture of American long staple cotton, India cotton, and American reworked waste. As a variation, there may also be introduced, into the bin, material which has previously passed through the apparatus of the present invention.

At the bottom of the bin 12 there is an advancing spiked belt 14. Masses of fibers are picked up by the spiked belt 14 and are advanced thereby through a limiting gate at 15, being transferred to another spiked belt 16 and carried upwardly thereby.

From the spiked belt 16 the fibers progress past a beater 18, falling into a hopper 20. Means not shown are provided for opening the hopper 20 at periodic intervals and thereby feeding batches of fibers downwardly onto a spiked belt 24. The spiked belt 24 carries the fibers into apparatus 22 which is adapted to arrange the fibers in a substantially uniform layer, with the fibers lying approximately parallel to one another and parallel to their direction of advance. For performing this operation, and also for performing the cross-lapping operation to be described, there may be employed apparatus similar to a garnetting machine, for example, a three-cylinder twin doffer garnet.

Figure 2:
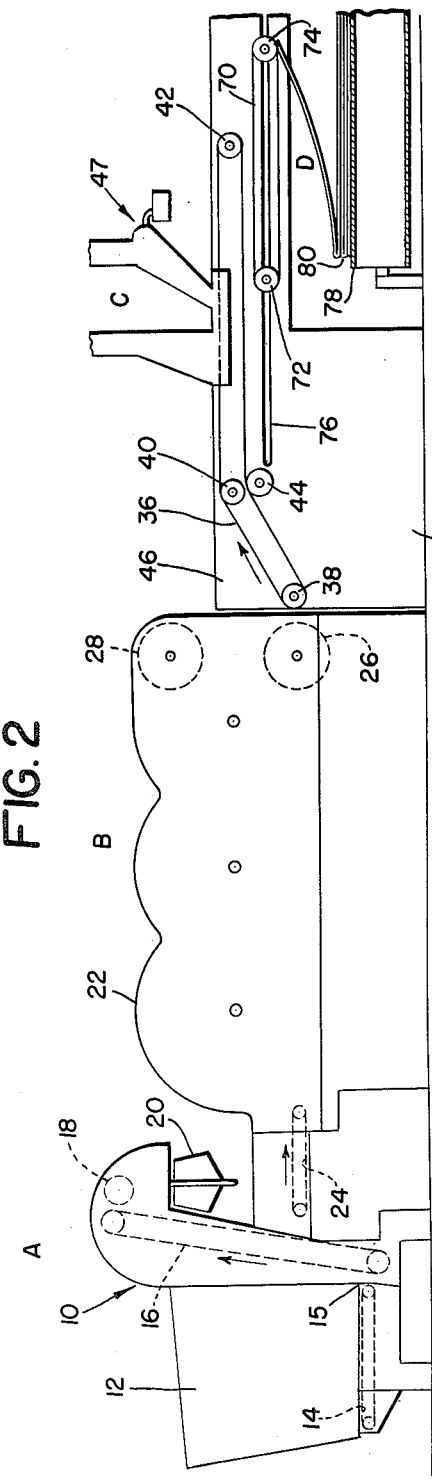

In Figs. 1 and 2, the apparatus schematically shown and designated as 22 comprises a portion of such a garnetting machine. Its two doffer rolls are indicated as 26 and 28. A layer of cotton fibers emerges from each of these two doffer rolls, being combed therefrom by combing means not shown. These two layers of fibers are combined on an advancing belt or apron 36 as a single layer. The belt or apron 36 is of slatted construction, and air may therefore pass through it. It may, as a variation, be of other types of perforated construction, including openings through which air may pass. The belt 36 is carried by rollers 38, 40, 42 and 44. These last-mentioned rollers are carried by shafts journaled in a stationary frame 46.

Figure 3:
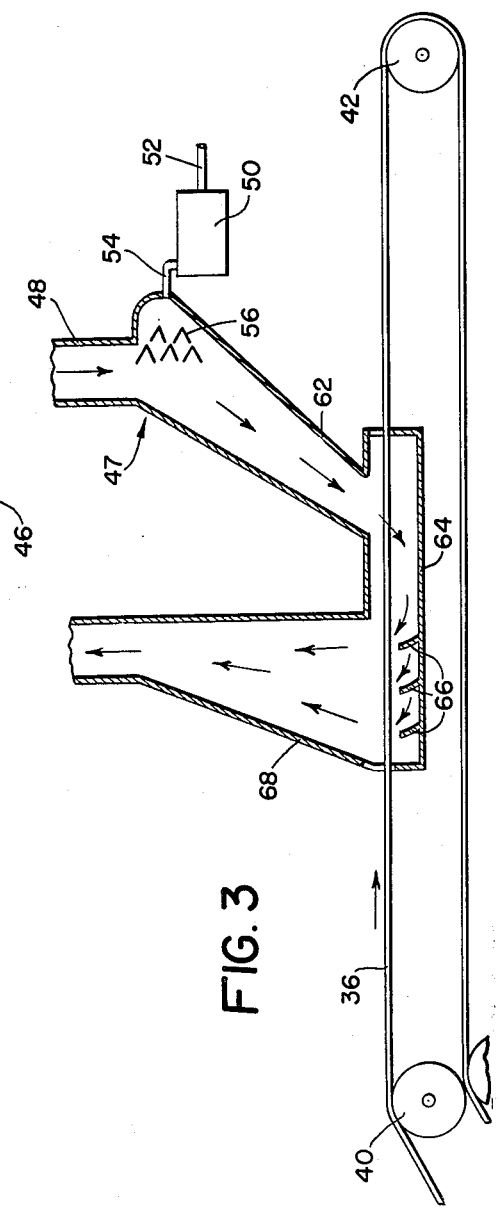

At station C a stream of air mixed with dry, powdered, thermoplastic resin is blown into, and to some extent through, the layer of fibers on the belt 36, by means best shown in Fig. 3.

There is provided, for this purpose, a source of an air stream, and a conduit generally indicated as 47 for directing same. The main air stream enters through a portion 48 of the conduit. Means are provided to mix a powdered resin with the air stream. This resin is held by a container 50. A supplemental air stream enters the container 50 through a conduit 52 and blows resin from this container via a conduit 54 into the main conduit 47. Baffles 56 are provided within the conduit 47 for assuring an even intermixture of the resin and the air stream.

The conduit 47 tapers to a smaller cross-sectional area in a region 62 near the slatted belt 36. A housing or box-like member 64, which is connected to the conduit 47, generally surrounds the belt 36. Openings are provided in either end of the housing 64 so that the belt 36 may pass therethrough.

The lower part of the housing 64 is arranged to receive air which passes through the layer of fibers and the belt 36, and to redirect this air upwardly through the belt and the layer, at a preceding point in their path. To aid in this direction of the air stream, there are provided upwardly-extending baffles or air foils 66. The air stream, after passing upwardly through the belt and the layer of fibers, leaves through a conduit portion 68.

As shown in Fig. 2, the layer of cotton fibers is next transferred from the belt 36 to a crosslapper or reciprocating apron comprising a belt 70 carried by rollers 72 and 74. These rollers are in turn carried by a movable frame, not shown, which reciprocates in a slot 76 in the frame 46.

The layer of cotton fibers is, because of the reciprocating motion of the movable frame, cross-lapped onto a floor apron or belt 78, as a composite, multiple-layered mass 80. The floor apron 78 advances in a horizontal direction, at right angles to the previous horizontal direction of advance of the cotton layer. This arrangement may be readily observed in Fig. 1. It is this arrangement which causes the cross-lapping of the layers onto the floor apron 78.

For the sake of clarity in Figs. 1–4 of the drawings, the layer of cotton fibers is shown only at the point where it is cross-lapped onto the floor apron 78 in Fig. 2, being omitted at other points since it is believed that its inclusion would tend to be confusing.

Figure 4:
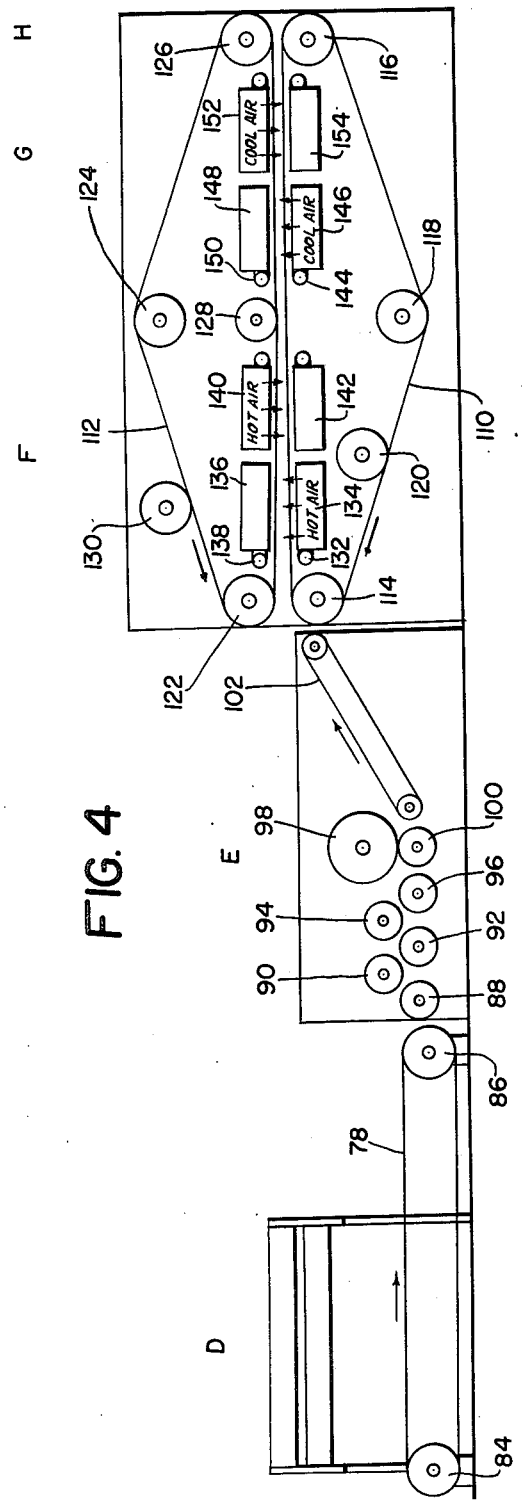
Fig. 4 is a vertical sectional view of a portion of the apparatus shown in Fig. 1, the sectional plane for Fig. 4 being indicated at 4—4 in Fig. 1.

Fig. 4 may now be considered, in connection with Fig. 1. The floor apron or belt 78 is carried by rollers 84 and 86, which rotate on stationary axes. The multiple-layered mass of cotton with the resin distributed therethrough is advanced by the floor apron 78 and then passes through a series of compression rolls 88, 90, 92, 94 and 96, which compact it somewhat. It then passes through vertical rotary cutters 98 and a backing roller 100, which trim its edges, or may be arranged to divide it longitudinally into strips or narrower layers.

The cotton is then advanced by a belt 102 to a heating zone, from whence it is advanced to a cooling zone. It passes between a belt 110 and a belt 112, the belt 110 being carried by rollers 114, 116 and 118, and being provided with a tensioning roller 120. The belt 112 is carried by rollers 122, 124, 126 and 128, and is provided with a tensioning roller 130.

The heating zone is between the rollers 122 and 128. The cooling zone is between the rollers 128 and 126. In the heating zone, the belts 110 and 112 converge slightly, so as progressively to diminish the thickness of the cotton. In the cooling zone, the upper and lower surfaces of the cotton are maintained approximately parallel, so that when the resin sets, the batting will be of approximately uniform thickness.

The belt 110 progresses along a substantially flat, unbroken plane between the rollers 114 and 116. Various supports may be provided in this region to aid in maintaining the flatness of the belt 110. In the illustrative apparatus, the movement of the belt 110 between the rollers 114 and 116 may be assumed to be horizontal. On the other hand, the belt 112 progresses slightly downwardly from the roller 122 to the roller 128, and then progresses horizontally from the roller 128 to the roller 126. This is accomplished by having the lower surfaces of the rollers 128 and 126 located at the equal distances from the belt 110, and having the lower surface of the roller 122 located somewhat farther away from the belt 110.

The belts 110 and 112 are provided with openings through which air may be blown. For this purpose they may be of a slatted construction, or may be of screening, or may be perforated.

In the heating zone, hot air from a source conduit 132 is blown via a duct-like air-directing means 134 upwardly through the belt 110 and the cotton, being withdrawn via a duct 136 and thence through a conduit 138. To assist in forcing the air through the cotton, not only is the zone within the conduit 132 and the duct 134 at a superatmospheric pressure, but the zone within the duct 136 and the conduit 138 is at a subatmospheric pressure. This may be accomplished by connecting the conduit 132 to the outlet side of a blower, and the conduit 138 to the intake side of the same or another blower.

By a similar arrangement, hot air is blown downwardly through the cotton from a duct 140, being removed under suction through a duct 142.

It may be noted that the heating zone comprises a first extended zone where hot air is blown upwardly, and a second extended zone where hot air is blown downwardly, the air passing through the cotton as it advances.

In the heating zone the resin is quickly heated to a temperature at which it is soft and tacky. In a typical case, using a copolymer of vinyl acetate and vinyl chloride, the resin may be heated to approximately 350° F. A more general typical range of temperature to which the resin may be heated is from 300° F. to 425° F., but the proper temperature will depend upon the resin used.

The cotton then advances through the cooling zone. Cool air from a conduit 144 is blown upwardly via a duct 146 through the belt and through the cotton, being removed under suction via a duct 148 and a conduit 150. Cool air is then, in a second zone, blown downwardly from the conduit 152, through the belt 112, the cotton, the belt 110, and is removed through a duct 154.

Superatmospheric pressure is maintained in the ducts 146 and 152 by connecting them to the output side of a blower. Subatmospheric pressure is maintained in the ducts 148 and 154 by connecting them to the intake side of the same or a different blower.

In the cooling zone the resin is cooled to a temperature at which it becomes set, thereby causing at least some of the fibers to adhere to one another. While it is being cooled, the upper and lower surfaces of the cotton layer are maintained approximately parallel.

It will be understood that instead of using air in the heating and cooling zones, and also as a vehicle for the resin in the apparatus of Fig. 3, other gases could be used.

A heating system in which hot air is blown into one side of the layer and sucked from the opposite side, then being recirculated, is particularly advantageous in that it provides rapid uniform heating, and it is efficient in conservation of heat.

It may be noted that in order to cause a large number of fibers to be bonded together with resin, a feature of one embodiment of the method disclosed herein is that there is first produced a very fluffy mass of fibers mixed with powdered thermoplastic resin, the mass having a greater thickness than that desired in the finished product. The resin throughout the mass is then heated to a soft, tacky, molten or semi-molten condition. While the resin is maintained in this condition by a continuous supply of heat, preferably with the aid of a stream of hot air, the mass of fibers is somewhat compacted, by the application of pressure to opposite surfaces of the mass. This compacting action causes various fibers to be pressed into contact or approximate contact with one another in certain zones, and as a consequence, in those zones where the tacky resin is present, the fibers become bonded together. Upon cooling, permanent links between fibers are formed.

While it is particularly advantageous to employ the lapping or cross-lapping steps described herein, it will be understood that irrespective of whether this feature is employed, considerable advantage is gained from other steps of the method described herein, particularly those relating to the feature of blowing a stream of gas with powdered resin suspended therein into the fibers. Thus in one advantageous method there are employed the steps of arranging the fibers in a mass having approximately a desired shape, mixing a dry, powdered thermoplastic resin with a stream of gas, directing the stream of gas and its entrained powdered resin into the mass of fibers, heating the resin to a temperature at which it is soft, and cooling the resin to bond at least some of the fibers together. The aforementioned desired shape may be the shape of a layer of batting, or may be of another shape.

It will be understood that there has also been described a method for forming batting and the like, comprising the steps of arranging fibers in an advancing layer, blowing an air stream together with a dry, powdered, thermoplastic resin into the layer, re-directing the air stream through the layer, cross-lapping the layer onto an advancing carrier to form a fluffy, composite batting, loosely compacting this batting, blowing hot air through the composite batting to heat the powdered thermoplastic resin to its softening point while slightly compacting the batting, and blowing cool air through the batting to cool the resin while maintaining the surfaces of the batting approximately parallel.

In a variation of the method, fibers and dry, powdered resin may be applied in alternate layers to a supporting surface, heated, and then cooled.

As another variation, instead of or in addition to blowing the powdered resin in as described above, resin may be introduced along with the fibers at station A.

Several illustrations of the method of the present invention will now be given:

A first illustration of the method comprises arranging a mass of cotton fibers in the form of fluffy batting, mixing a powdered copolymer of vinyl acetate and vinyl chloride with a stream of air, directing the stream of air and its entrained powdered resin into the mass of fibers, heating the resin and fibers to approximately 340° F. by directing into the mass of fibers a forced draft of heated air, cooling the resin and fibers to approximately 90° F. by a forced draft of cooler air, and cutting the batting into portions which may be used without further substantial change, or which may be subsequently modified to conform to a desired shape.

A second illustration of the method comprises arranging fibers in an advancing layer, applying dry, powdered thermoplastic resin to the layer, cross-lapping this layer to form a multiple-layered batting of fibers with resin distributed therethrough, heating the resin to its softening point, and cooling the resin while maintaining the upper and lower surfaces of the batting approximately parallel.

A third illustration of the method includes the steps of arranging cotton fibers in a partly-oriented, continuously-advancing layer, blowing into one side of the layer an air stream together with a dry, powdered resin comprising a copolymer of vinyl acetate and vinyl chloride, and re-directing the stream of air and resin into the other side of said layer. A suitable quantity of resin to add to the fibers is about 1 part resin to 3 parts of fibers, by weight. The next steps are cross-lapping the layer onto an advancing carrier to form a batting thicker than eventually desired and then loosely compacting this batting. Next, hot air is blown into one surface of the batting while a suction is applied to the opposite surface. This step is repeated in the reverse direction so as to blow hot air into the surface to which the suction was formerly applied. The batting is loosely compacted further during this heating process. The batting and the resin are thereafter cooled, while maintaining the opposite surfaces approximately parallel.

A fourth illustration of the method comprises preparing batting by following the steps of any one of the illustrations given above, shredding this batting, preparing new batting by garnetting the shreds, with or without the addition of more fibers, heating to a temperature at which the resin is soft, and cooling to a temperature at which the resin sets. If more fibers are added, a suitable quantity to add is about 1 part for each 4 parts of the shreds, by weight.

A fifth illustration of the method comprises preparing batting by following the steps of the fourth illustration, with the additional step of impregnating the new batting with more powdered thermoplastic resin mixed with a stream of air, during or after garnetting. A suitable quantity of resin to add at this point is about 5 parts resin for each 100 parts of the new batting, by weight.

Figure 5:
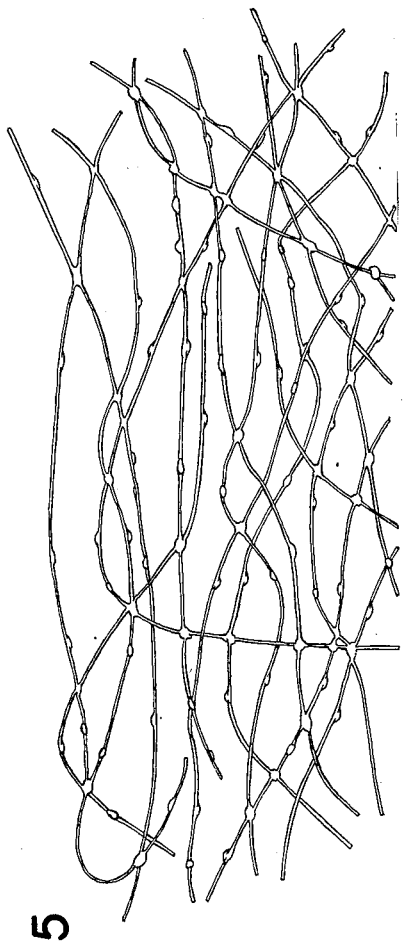
Fig. 5 is a schematic view of a product which may be made according to the present invention. In this drawing there is shown a mass of cotton fibers which have been bonded together with a synthetic resin.

In Fig. 5 there is shown a schematic illustration of a portion of a product which may be produced by the present invention. In this figure there is illustrated a mass of cotton fibers bonded together by a fused, powdered thermoplastic resin. The fibers shown in Fig. 5 may be considered to comprise a small portion of a bat the upper and lower surfaces of which are flat and parallel. Such a bat may be used in making pads for wearing apparel and the like. In making such pads the bat may be severed into the approximate shape desired and then moulded into the finished shape by heat and pressure.

Pads used for wearing apparel, for example, shoulder pads, may include an inner, relatively fluffy, resilient portion and also a more dense, felt-like portion on the outer surfaces. While the present invention may be used in forming both the type of material used in the inner portion of shoulder pads and that used for the surface material, it is particularly advantageous in forming the former.

A product suitable for insulating material or packing material, and also suitable for subsequent moulding to form the inner portion of such pads, made in accordance with the present invention, may comprise a fluffy, resilient mass of cotton fibers bonded together only by fused, powdered particles of a copolymer of vinyl acetate and vinyl chloride evenly distributed through the mass, this product having a specific gravity of not more than 0.04, that is, weighing not more than 40 grams per liter. In this product the air space comprises at least approximately 97% of the total volume of the product.

The resulting product is superior in many ways to padding of other types, and yet there is a considerable saving of fibers which may be effected, for example, 50%. That is, by adding powdered thermoplastic resin to the fibers by the method described herein, it is possible to produce a product which, although containing considerably less fibers, is superior to one made from fibers alone.

If the above-mentioned product, having a specific gravity no greater than 0.04, is moulded and compressed further, as in forming a pad, its specific gravity may become several times as great, or as high as about 0.26.

In certain of the products of the present invention the fibers should be partly oriented; that is, there should be a tendency for them to run in the same direction, although they will not be exactly parallel and certain fibers will run in random directions.

As shown in Fig. 5, the fused resin particles adhere to the fibers, some particles adhering at points where one fiber crosses another, so as to bond the fibers together, and other particles adhering to the fibers at other points.

A characteristic desired in many types of padding is that the entire mass be yieldable under pressure, but that it tend to return toward its original shape when the pressure is released. In resilient padding which may be produced by the present invention, the fused, powdered thermoplastic resin particles cooperate with the cotton fibers to increase the aforementioned characteristic. One function of the resin is to provide a number of links between the fibers, these links being of a semi-elastic nature. By thus linking the fibers, the resin particles tend to prevent one fiber from slipping with respect to another, when the mass is compressed or deformed. Instead of the fibers slipping with respect to one another, what probably happens is that certain of the fibers become bent or bowed in regions between points where they are linked to other fibers by the resin. The individual bent or bowed fibers have a tendency to restore themselves to their original shape, thereby tending to restore the entire mass to its original shape when the compressing or deforming force is removed.

The particles of fused resin which adhere to fibers in regions other than where one fiber crosses another probably also contribute to the resiliency of the mass by forming a partial coating of these fibers with a semi-elastic resilient resin. In addition, these particles are available to form additional links between fibers, in case, at any time during the life of the pad, additional heat and pressure is applied. This property is useful since it makes it possible to reshape the pad into a desired form by the application of heat and pressure.

It may be observed in Fig. 5 that the fused, powdered resin particles are rounded by surface tension, because of the fact that they have been heated until soft, and then solidified.

As an illustration of the size of the dry, powdered resin particles which may be used, particles (of a copolymer of vinyl acetate and vinyl chloride) having the approximate size distribution given below have been used satisfactorily, in connection with cotton fibers.

| Percent of particles | Screen size through which they will pass (openings to the inch) |
| --- | --- |
| 5% | 400 |
| 10% | 300 |
| 60% | 200 |
| 95% | 100 |
| 100% | 50 |

It will be understood that these figures are purely illustrative. Moreover, it may prove desirable to employ particles more nearly the same size than in this illustration.

In one form of the invention, the resin particles should be sufficiently small that, when they are in the dry, powdered form, and before fusing, they may be adsorbed to the individual cotton fibers when blown into the fiber mass.

For best results, particularly in producing a product useful in pads for wearing apparel and the like, from cotton and a copolymer of vinyl acetate and vinyl chloride, the weight of the resin in the finished product should comprise not less than 10% and not more than 50% of the weight of the fibers plus resin. The resin should soften or melt at a temperature below the charring point of the fibers used, and at a temperature above about 250° so that steam will not melt it if the pad is subjected to ordinary pressing operations at cleaning establishments.

A suitable copolymer of vinyl acetate and vinyl chloride is one having an average molecular weight of approximately 6000, formed from about 86% polyvinyl chloride and 14% polyvinyl acetate, by weight. Such a substance is sold by the Bakelite Corporation under the trade name "VYHH."

As a variation, one may satisfactorily use a copolymer of vinyl acetate and vinyl chloride formed from about 86% polyvinyl chloride, 13% polyvinyl acetate, and 1% interpolymeric dibasic acid (0.7 to 0.8 carboxyl), by weight, and having a molecular weight of about 6000. Such a substance is sold by the Bakelite Corporation under the trade name "VMCH."

While as stated above, the product of the present invention is particularly useful in forming pads for wearing apparel and the like, it is also useful for many other purposes.

It may, as stated, be used, in batting form, without further alteration, as packing material.

It also may be moulded into a variety of useful shapes. In these moulding operations the presence of fused particles of resin adhering to the fibers at random points is quite useful in forming additional links.

One very advantageous procedure, in using the product of the present invention as packing material for certain objects, is to form, in a surface of the batting, cavities conforming to the shape of the article which is to be packed. Such a shaped cavity may be formed by pressing the batting with a hot die or form. In some cases mating cavities may thus be formed in different pieces of batting so as to fit around both sides of an object which is to be packed.

It will be understood that in addition to a fluffy type of product, which may be used for the inner portions of shoulder pads and the like, or for packing material, it is possible, by the present invention, to produce products which are considerably more dense or compact. One way of controlling the compactness of the resulting product is by varying the extent to which the product is compressed at the heating station F.

In the finished product the volume of air may comprise as little as 70% or as much as 99½% of the total volume. A very useful range is one between about 90% and 99%.

The finished product may also vary widely in the degree of stiffness. In general, the more resin used, the stiffer will be the product.

Among the products which may be made wholly or partly in accordance with the present invention, in addition to the padding material, packing material, and batting mentioned above, are upholstery padding, stuffed and shaped articles such as toys, portions of artificial limbs, construction material such as wallboard, soundproofing material, and insulating material.

It will be understood that while, for the sake of efficiency, it is desirable to carry out the various steps of the method of the present invention as a continuous, or semi-continuous process, the invention is not necessarily limited to this mode of operation.

While a suitable form of apparatus and method, to be used in accordance with the invention, and various products resulting therefrom have been described in some detail, and certain modifications have been suggested, it will be understood that numerous changes may be made without departing from the general principles and scope of the invention.

We claim:

1. A method of forming batting, comprising the steps of (a) arranging cotton fibers in an advancing layer, (b) blowing an air stream together with a dry, powdered thermoplastic resin into said layer, (c) cross-lapping said layer on an advancing carrier to form a fluffy, composite batting, (d) loosely compacting said batting, (e) blowing hot air through said composite batting to heat said powdered thermoplastic resin to its softening point, (f) cooling said resin while maintaining the surfaces of said batting approximately parallel, (g) shredding the batting thus formed, (h) mixing the shreds thus derived with additional cotton fibers, (i) arranging as an advancing layer of fibers said additional fibers and fibers from said shreds, and (j) repeating steps (b) through (f), thereby forming batting having a particularly uniform distribution of resin therethrough.

2. A method of bonding fibers together, comprising arranging said fibers in a layer on an advancing, flexible, perforated carrier belt, blowing an air stream together with a dry, powdered thermoplastic resin into said layer while it advances on said belt, loosely compacting said layer, heating the resin in said layer to a temperature at which it is tacky by blowing hot air through said layer, cooling said resin in said layer, shredding and garnetting said layer, to produce a new layer having resin distributed therethrough with a high degree of uniformity, heating said new layer to a temperature at which said resin is tacky, and cooling said layer.

3. A method as in claim 2, including the additional step of adding more thermoplastic resin to said new layer before heating said new layer.

4. A method as in claim 2, including the step of mixing more fibers with the shreds immediately prior to said garnetting step.

5. A method of forming batting, comprising applying fibrous material, at least a major portion of which consists of cotton fibers, as a thin layer on an advancing flexible, perforated carrier belt, with said fibers oriented predominantly lengthwise of said belt, mixing a dry, powdered, thermoplastic vinyl resin with air and directing a stream of the resulting mixture into said layer, through the exposed face thereof, at a station where said layer is supported and advanced by said perforated carrier belt, so as to distribute said resin throughout said layer, said resin being non-tacky at room temperature but having a softening temperature below the charring temperature of cotton, removing said layer from said carrier belt and cross-lapping it with said resin therein onto another advancing carrier belt to form a fluffy, composite batting, loosely compacting said batting with the aid of rollers to reduce its thickness somewhat while said resin is in a non-tacky condition, thereafter advancing said batting between converging perforated belts, to reduce its thickness gradually and progressively as it advances through a compacting and heating zone while progressively heating it by blowing a hot gas into its two faces at successive stations, whereby to heat said batting to a temperature high enough to render said resin soft and tacky but not high enough to char said cotton fibers, and whereby to cause said resin to bond said fibers together at many of their crossing points, and thereafter advancing said batting between approximately parallel perforated belts through a cooling zone while blowing a cool gas through said batting to set said resin therein, while maintaining said batting in a compressed condition.

6. A method of forming batting, comprising impregnating with a powdered thermoplastic resin a mass of loose fibrous material the majority of which consists of non-thermoplastic fibers, to form a mass of composite material, dividing said mass of composite material into individual aggregates each comprising thermoplastic resin and non-thermoplastic material, intimately combining said aggregates with cotton fibers and forming a relatively thin advancing layer comprising said aggregates and cotton fibers, cross-lapping said advancing layer to form a thicker layer, gradually compressing said thicker layer while blowing hot air through it, and then cooling said layer, so as first to soften and then to set the thermoplastic resin therein, to bond said cotton fibers together.

7. Apparatus for forming batting, comprising a shredder for shredding fibrous material, a perforated, advancing, carrier belt, means for applying shredded fibrous material as a thin layer to said advancing carrier belt with fibrous portions of said material lying predominantly lengthwise of said belt, means for mixing a powdered thermo-responsive resin with air and for directing a stream of the resulting mixture into said layer as it advances on said perforated belt, so as to distribute said powdered resin throughout said layer, means for cross-lapping said layer including said resin onto another advancing carrier, a pair of perforated belts which converge in a compressing and heating zone, for compressing said layer gradually as it advances through said zone, means for blowing a hot gas through said layer as it advances through said zone, said belts advancing parallel to one another through a subsequent cooling zone, so as to hold said layer in a compressed state through said zone, and means for blowing a cool gas through said layer in said cooling zone.

8. Apparatus for forming batting comprising fibers bonded together with a thermoplastic resin, said apparatus comprising an advancing belt having openings therethrough, means for arranging fibrous material as a continuous, advancing layer on said belt, a source of an air stream, means for mixing a powdered thermoplastic resin with said air stream, means for directing said air stream together with said powdered resin against the exposed surface of said layer of fibers as it advances on said belt, whereby said air stream passes through said layer and through the said openings of said belt, and whereby at least some of said powdered resin is mixed with and introduced into said layer, conduit means including baffles therein for re-directing resin-laden air which has passed through said belt, again through said layer, a belt advancing in a transverse direction with respect to the motion of said first belt, cross-lapping means for transferring said layer from said first belt to said second belt so as to form a plurality of layers on said second belt, thereby forming a composite mass including fibers and resin, a pair of converging belts for gradually reducing the thickness of said composite mass in a compacting and heating zone, means for blowing hot air through said composite mass in said zone for raising said thermoplastic resin to a temperature at which it is soft and tacky, parallel belts for maintaining the upper and lower surfaces of said composite mass approximately parallel as it advances through a subsequent cooling zone, and means for blowing cool air through said composite mass while its upper and lower surfaces are held approximately parallel, to set said resin.

9. A method of forming batting, comprising arranging fibrous material in a loose, pervious layer on a perforated, advancing, flexible carrier belt, blowing an air stream together with a dry, powdered thermoplastic resin into said layer while it is supported and advanced on said perforated carrier belt, cross-lapping said layer onto another advancing carrier belt to form a fluffy, composite batting, blowing hot air through said composite batting to heat said powdered thermoplastic resin to its softening point, cooling said resin while maintaining the surfaces of said batting approximately parallel, thereby producing batting, then shredding said batting to produce new fibrous material, and thereafter treating said new fibrous material again by all said steps mentioned prior to said shredding step.

10. A method of bonding fibers together into a continuous sheet, comprising applying fibrous material at least a major portion of which consists of fibers as a thin layer on an advancing, flexible, carrier belt having openings therethrough, with said fibers oriented predominantly lengthwise of said carrier belt, mixing a dry, powdered, thermoplastic resin with a stream of air and directing the resulting mixture into said layer, through the exposed face thereof, at a station where said layer is supported and advanced by said carrier belt, so as to distribute said resin throughout said layer, said resin being non-tacky at room temperature but having a softening temperature below the charring temperature of said fibers, removing said layer from said carrier belt and cross-lapping it with said resin therein onto another advancing carrier belt to form at this point a fluffy, composite batting, compacting said batting with the aid of rollers to reduce its thickness somewhat while said resin is in a non-tacky condition, thereafter applying heat in successive zones first to one surface and then the other of said layer to heat said layer to a temperature high enough to render said resin soft and tacky but not high enough to char said fibers, further compacting said layer, and cooling same while maintaining it in a compressed condition, whereby to cause said resin to bond said fibers together at many of their crossing points.

11. Apparatus for bonding fibrous material together into a continuous sheet, comprising a shredder for shredding fibrous material, a perforated, advancing, carrier belt, means for applying shredded fibrous material as a thin layer to said advancing carrier belt with fibrous portions of said material lying predominantly lengthwise of said belt, means for mixing a dry, powdered, thermoplastic resin with air and for directing a stream of the resulting mixture into said layer through the exposed surface thereof so as to distribute said resin throughout said layer as it advances on said perforated belt, means for cross-lapping said layer including said resin onto another advancing carrier belt, to form at this point a fluffy, composite batting, rollers for compacting said batting while said resin is in a non-tacky condition, heating means arranged to impart heat to said layer successively to opposite surfaces thereof, for heating said layer to a temperature high enough to render said resin soft and tacky but not high enough to char said fibrous material, means for further compacting said layer, whereby to cause said resin to bond the fibrous portions of said material together at many of their crossing points, and means for cooling said layer while maintaining it in a compressed condition.

MARC A. CHAVANNES.
JAMES W. HOWDEN.

References Cited in the file of this patent
UNITED STATES PATENTS

| Number | Name | Date |
|---|---|---|
| 758,246 | Goldman | Apr. 26, 1904 |
| 951,841 | Peterson | Mar. 15, 1910 |
| 1,461,337 | Weiss | July 10, 1923 |
| 1,608,165 | Brown et al. | Nov. 23, 1926 |
| 1,923,195 | Finck | Aug. 22, 1933 |
| 1,940,975 | Shaver | Dec. 26, 1933 |
| 2,122,472 | Hurst et al. | July 5, 1938 |
| 2,288,072 | Collins | June 30, 1942 |
| 2,357,392 | Francis | Sept. 5, 1944 |
| 2,372,433 | Koon | Mar. 27, 1945 |
| 2,373,033 | Kopplin | Apr. 3, 1945 |
| 2,459,804 | Francis | Jan. 25, 1949 |
| 2,477,555 | Roberts et al. | July 26, 1949 |
| 2,589,008 | Lannan | Mar. 11, 1952 |